Dec. 16, 1969     H. L. STANCIL ET AL     3,484,743

TURN SIGNALS FOR MOTORCYCLES AND THE LIKE

Filed April 29, 1968

INVENTORS
Joseph E. Stancil
Harry L. Stancil

BY Alexander B. Blair

ATTORNEY

United States Patent Office 3,484,743
Patented Dec. 16, 1969

3,484,743
TURN SIGNALS FOR MOTORCYCLES AND THE LIKE
Harry L. Stancil, 618 Hiller St., Belmont, Calif. 94002, and Joseph E. Stancil, 659 Main St., Placerville, Calif. 95667
Filed Apr. 29, 1968, Ser. No. 725,087
Int. Cl. B60q 1/46
U.S. Cl. 340—82                                    1 Claim

ABSTRACT OF THE DISCLOSURE

A single bank of signal lights extends across each of the front and rear of a motorcycle, and a selectively operable switch mechanism, having a single reversible motor, progressively energizes the lights of each bank from one side to the other, depending upon whether the operator desires to give a left or right turn signal.

BACKGROUND OF THE INVENTION

It is a fairly common practice to provide automobiles with two banks of lights in alignment with each other, one at one side of the vehicle and the other at the other side, and to progressively illuminate the right turn signal bank from left to right, and to energize the left turn bank of lights progressively from right to left. Each of these signal devices has its own switch mechanism and its own motor for operating such switch mechanism. Such pair of banks of lights, of course, would be impracticable on a motorcycle or bicycle because of the narrow width of the vehicle.

SUMMARY OF THE INVENTION

Two banks of lights are employed, each comprising preferably but not necessarily four aligned signal lights, one bank being arranged forwardly of the motorcycle or bicycle and the other rearwardly thereof. A single switch mechanism is provided with a single drive motor which is reversible, and the direction of rotation of the motor shaft is determined by movement of an operating switch lever. When this switch lever is moved to the left, the motor rotates in one direction to turn the switching mechanism to illuminate the lights of each bank progressively from right to left. Similarly, when the switch lever is moved to the right of its neutral position, the motor is reversed to reverse the operation of the switch mechanism to illuminate the lights of each bank progressively from left to right, thus indicating the direction of turning of the vehicle. The switch mechanism may be in the form of a rotary shaft having cams corresponding in number to the light bulbs of each bank of lights and offset circumferentially of the shaft to operate progressively switch actuating arms each of which completes a circuit to the corresponding light of each forward and rear light bank. At the completion of each cycle of operation of the lights, the lights go out, and will repeatedly be operated in sequence as long as the control switch lever remains in left turn or right turn position.

DESCRIPTION OF THE PREFERRED EMBODIMENT

Figure 1:
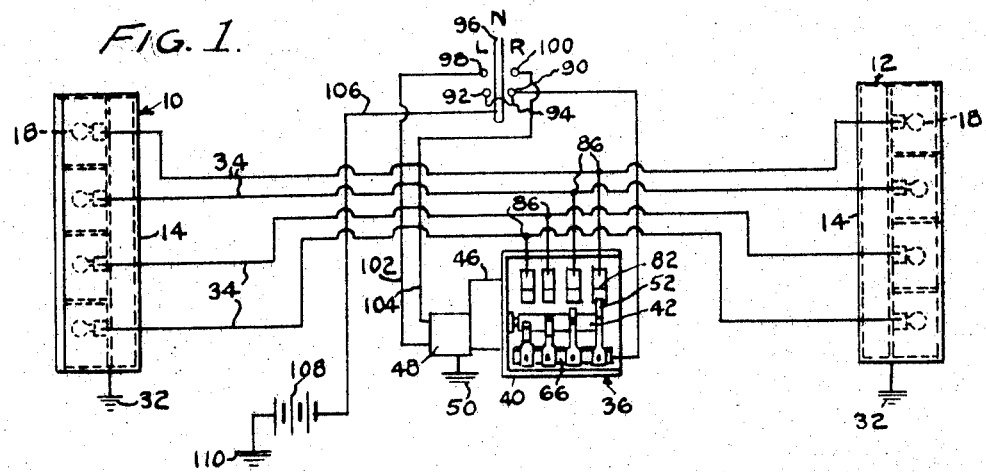
FIGURE 1 is a diagrammatic view of the electrical circuit for the mechanism.
Figure 2:
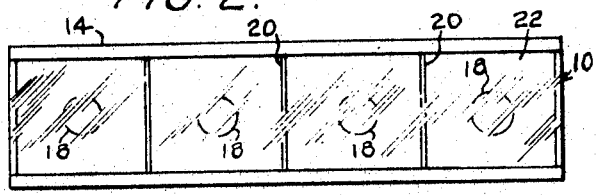
FIGURE 2 is an enlarged face view of one bank of signal lights.

Referring to FIGURE 1 the numerals 10 and 12 indicate as a whole, respectively, the transverse light banks reawardly and forwardly of a motorcycle. Each light bank comprises a casing 14 (FIGURE 3), having a partition 16 longitudinally therethrough supporting a plurality of signal light bulbs 18, these bulbs being separated by transverse partitions 20. The face of the casing is closed by a colored glass or other similiar material 22. Preferably the glass 22 for the rear light bank 10 is red, while that for the bank 12 is preferably amber.

Figure 3:
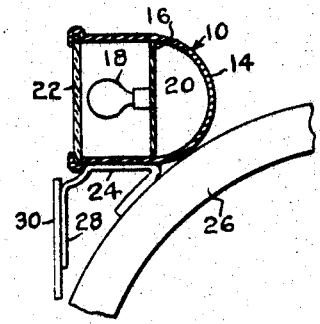
FIGURE 3 is a sectional view transversely through one bank of lights showing one method of mounting the casing of the light bank relative to a fender of the motorcycle or bicycle.

The casings 14 extend horizontally transversely of the motorcycle or bicycle and may be supported in any suitable manner, for example, as shown in FIGURE 3. A bracket 24 welded or otherwise secured to the casing 14 is secured to a fender 26 and the bracket 24 may extend downwardly as at 28 to support a vehicle license plate 30.

Each casing 14 is grounded as at 32, and wires 34 are connected between corresponding lights of the two casings 14 as shown in FIGURE 1.

A switch mechanism indicated as a whole by the numeral 36 is operable for connecting a source of current successively to the wires 34. Such switch mechanism comprises a body 38 of insulating plastic material through one end wall 40 of which extends a hub 42 mounted on a shaft 44 extending into a speed reduction gear device 46. The output of the gear device 46 is connected to the shaft 44 and the input shaft is driven by a reversible direct current motor 48, having one terminal grounded as at 50.

The hub 42 is elongated and carries a series of preferably integral plastic cams 52, 54, 56 and 58 (FIGURES 4 and 5), which cams are progressively circumferentially offset from one end of the hub 42 to the other. Each of these cams, upon rotation of the hub 42, is engageable with the inner upper end of an arm 60 fulcrumed as at 62 on a bracket arm 64, the base 66 of which is fixed to an insulating plate 68. Each arm 60 is normally positioned as shown in FIGURE 4, the outer lower end of each such arm contacting with the free end of the bracket base 66.

Figure 4:
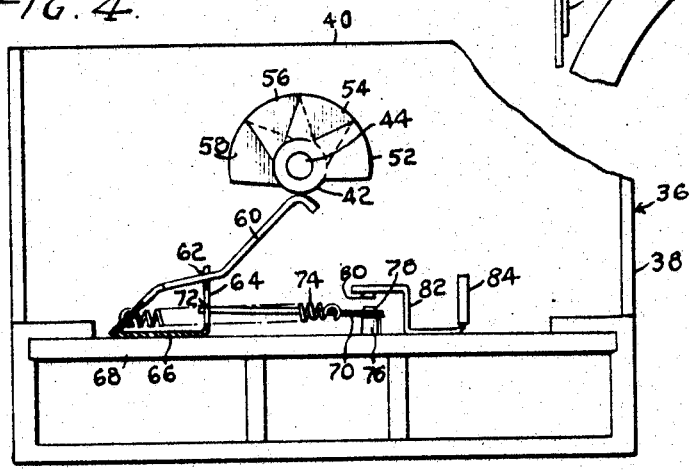
FIGURE 4 is an enlarged end elevation of the switch mechanism, parts being shown in section.
Figure 5:
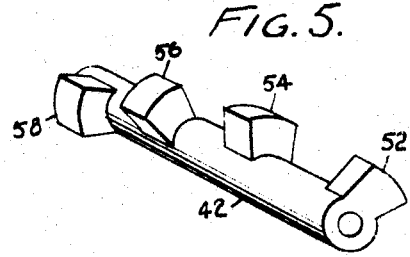
FIGURE 5 is a detailed perspective view of the shaft for the switch mechanism showing the individual switch operating cams.

Snap-over arms 70 are fulcrumed at 72 to the bracket arms 64 and normally slope downwardly toward the right as in FIGURE 4. An off-center spring 72 is connected at one end to each arm 70 and at its other end to the lower outer end of one arm 60. It will be noted that the centerline of the spring 72, when in normal position as in FIGURE 4, is arranged slightly below the fulcrum 72 to bias for downward movement the free end of each arm 70.

Downward movement of the free end of each arm 70 is limited by a stop 76 integral with and projecting upwardly from the insulating plate 68. The free end of each arm 70 is provided on its upper face with a contact 78 movable upwardly to engage a contact 80 carried by a bracket arm 82, such action taking place upon downward movement of the upper end of any arm 60 accompanied by the raising of the associated end of the spring 74 past the fulcrum point 72. The bracket 82 is provided with an upstanding closed tab 84 in which a wire may be soldered. In the present instance there are four lights in each bank 10 and 12, and accordingly, there are four switch arms 60 and contacts 80 and associated elements. Each tab 84 is connected by a wire 86 to one of the wires 34 as shown in FIGURE 1.

The bracket base 66 (FIGURE 4) extends entirely along the switch arms 60 transversely thereof (FIGURE 1) and accordingly has electrical connection with each arm 70 and its associated contact 78. The bracket base 66 is connected by a wire 88 (FIGURE 1) to a switch contact 90, this being one of a pair of contacts, the other of which is indicated at 92, and which contacts are connected to each other as at 94.

The main control switch comprises an arm 96, normally occupying the neutral position in FIGURE 1 indicated by the letter N. For a left turn signal, the switch arm 96 is moved to the left toward the letter L, and for a right turn signal, the switch arm is moved toward the letter R. Either movement of the switch arm 96 will engage one of the contacts 90 or 92. Similarly, movement of the switch arm 96 engages either of a pair of contacts 98 and 100, respectively connected by wires 102 and 104 to the motor 48 to determine the direction of rotation of the shaft of the motor.

The switch arm 96 is connected by a wire 106 to one terminal of the vehicle battery 108, the other terminal of which is grounded as at 110.

OPERATION

When a left turn signal is to be given, the switch arm 96 is moved to the left in FIGURE 1 to engage contacts 92 and 98. A circuit will be completed through the field of the motor 48, through wire 102 to rotate the hub 42 in one direction, namely, clockwise in FIGURE 4. Under such conditions, the contacts 52, 54, 56 and 58, in that order, will actuate their associated arms 60 to close the proper circuits across contacts 78 and 80 of the switch mechanism 36, thus progressively illuminating the lights 18 from right to left, that is, from the top toward the bottom as viewed in FIGURE 1. As long as the switch arm 96 remains in left turn indicating position, the sequential operation of the signal lights 18 will continue. The switch arm may be returned to neutral position by hand or may be provided with a conventional cancelling device.

When a right turn signal is to be indicated, the switch arm 96 will be moved to the right to engage contacts 90 and 100, thus closing a circuit through wire 104 to the motor 48 to rotate the armature thereof in the opposite direction, that is, counterclockwise as viewed in FIGURE 4 to cause the cams 58, 56, 54 and 52, in that order, to actuate their switch arms 60, thus sequentially closing circuits through the signal lights 18 of each bank from left to right, that is, from bottom to top as viewed in FIGURE 1.

It will be obvious that a single bank of lights may be employed for one end, but preferably for both ends, of a motorcycle or bicycle, and each bank of lights will not be unduly long according to the width of the vehicle. A single bank of lights is employed to indicate both left and righthand turns, whereas motor vehicles employing sequentially operated lights of this general type must use separate banks for right and left turn signals. The present mechanism uses a single bank of lights. In automobile practice separate switch mechanisms similar to the mechanism 36 must be used for right and left turn signals and each such switch mechanism employs its own motor. A single motor and a single switch mechanism 36 are employed in the present construction, the single motor being reversible.

In the case of motorcycles, the conventional battery 108 will be employed as a source of current. When used on a bicycle, suitable dry cells may be used as the source of current.

From the foregoing it will now be seen that there is herein provided an improved turn signals for motorcycles and the like which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

We claim:

1. A vehicle direction signal comprising a horizontal casing, a plurality of spaced vertical partitions dividing said casing into compartments, a single bank of horizontally arranged lights each arranged in one of said compartments, a switch mechanism for controlling said lights, said switch mechanism comprising a horizontal rotatable shaft, a plurality of radially projecting cams carried by said shaft, and having arcuate radially outer ends, such ends of said cams being of equal length and said cams being successively circumferentially offset from each other, a switch operating arm associated with each cam and having an operating end engageable thereby, a switch arm associated with each operating arm and having an over-center spring connected at one end thereto and connected at its other end to the associated operating arm, a contact normally spaced above each switch arm and engageable thereby upon operation thereof by the associated operating arm, each cam having said radially outer end thereof terminating at a point in the radial plane of the starting end of the next adjacent cam whereby, when said shaft is rotated in either direction, each switch arm will become inoperative substantially simultaneously with the operation of the next successive switch arm, circuits for said lights including a wire connected from each of said contacts to one of said lights, a single reversible motor connected to said shaft to rotate it, and a reversing switch for controlling said motor.

References Cited

UNITED STATES PATENTS

| | | |
|---|---|---|
| 643,872 | 2/1900 | Hill. |
| 1,784,884 | 12/1930 | Smith. |
| 2,478,908 | 8/1949 | Edgerton _____ 340—331 |
| 3,271,541 | 9/1966 | Dotto et al. |

FOREIGN PATENTS

| | | |
|---|---|---|
| 627,806 | 6/1927 | France. |
| 433,046 | 8/1926 | Germany. |
| 374,523 | 6/1932 | Great Britain. |
| 295,877 | 3/1954 | Switzerland. |

JOHN W. CALDWELL, Primary Examiner

KENNETH N. LEIMER, Assistant Examiner

U.S. Cl. X.R.

200—38, 61.27, 153; 340—100